United States Patent [19]

Dykstra et al.

[11] Patent Number: 4,686,609
[45] Date of Patent: Aug. 11, 1987

[54] VEHICLE INTERIOR LIGHT

[75] Inventors: Ronald A. Dykstra, Rockford; Mark W. Hawks; Jerry M. De Jong, both of Holland, all of Mich.

[73] Assignee: Prince Corporation, Holland, Mich.

[21] Appl. No.: 818,335

[22] Filed: Jan. 13, 1986

[51] Int. Cl.⁴ .......................... B60Q 1/00; B60Q 3/00
[52] U.S. Cl. ...................................... 362/61; 362/141
[58] Field of Search ............. 362/16, 61, 66, 74, 362/280, 319, 277, 140–142

[56] References Cited

U.S. PATENT DOCUMENTS

| 1,364,278 | 1/1921 | Hochstetter. | |
| 1,600,067 | 9/1926 | Retze | 362/319 X |
| 1,686,525 | 10/1928 | House. | |
| 2,075,199 | 3/1937 | Horner. | |
| 2,580,258 | 12/1951 | Tarasuk | 362/141 |
| 2,783,365 | 2/1957 | Wilfert. | |
| 2,879,379 | 3/1959 | Lyons | 362/141 |
| 3,917,938 | 11/1975 | Ferrada et al. | 240/7.1 |
| 3,944,804 | 3/1976 | Wisdom | 240/7.25 |
| 4,066,884 | 1/1978 | Taylor | 362/16 |
| 4,227,241 | 10/1980 | Marcus | 362/61 |
| 4,241,870 | 12/1980 | Marcus | 296/37.7 |
| 4,298,912 | 11/1981 | Dearth | 362/66 |

Primary Examiner—Lloyd L. King
Attorney, Agent, or Firm—Price, Heneveld, Cooper, DeWitt & Litton

[57] ABSTRACT

An interior light for a vehicle includes a lamp housing for attachment to a vehicle with a lamp positioned within the housing. A cover panel is coupled to the housing, and a light control panel is slidably mounted between the housing and cover panel. The light control panel includes at least a pair of spaced sections which can be selectively aligned with the lamp, with each of the sections uniquely controlling light from the lamp to provide a selectable lighting effect by movement of the light control panel.

20 Claims, 9 Drawing Figures

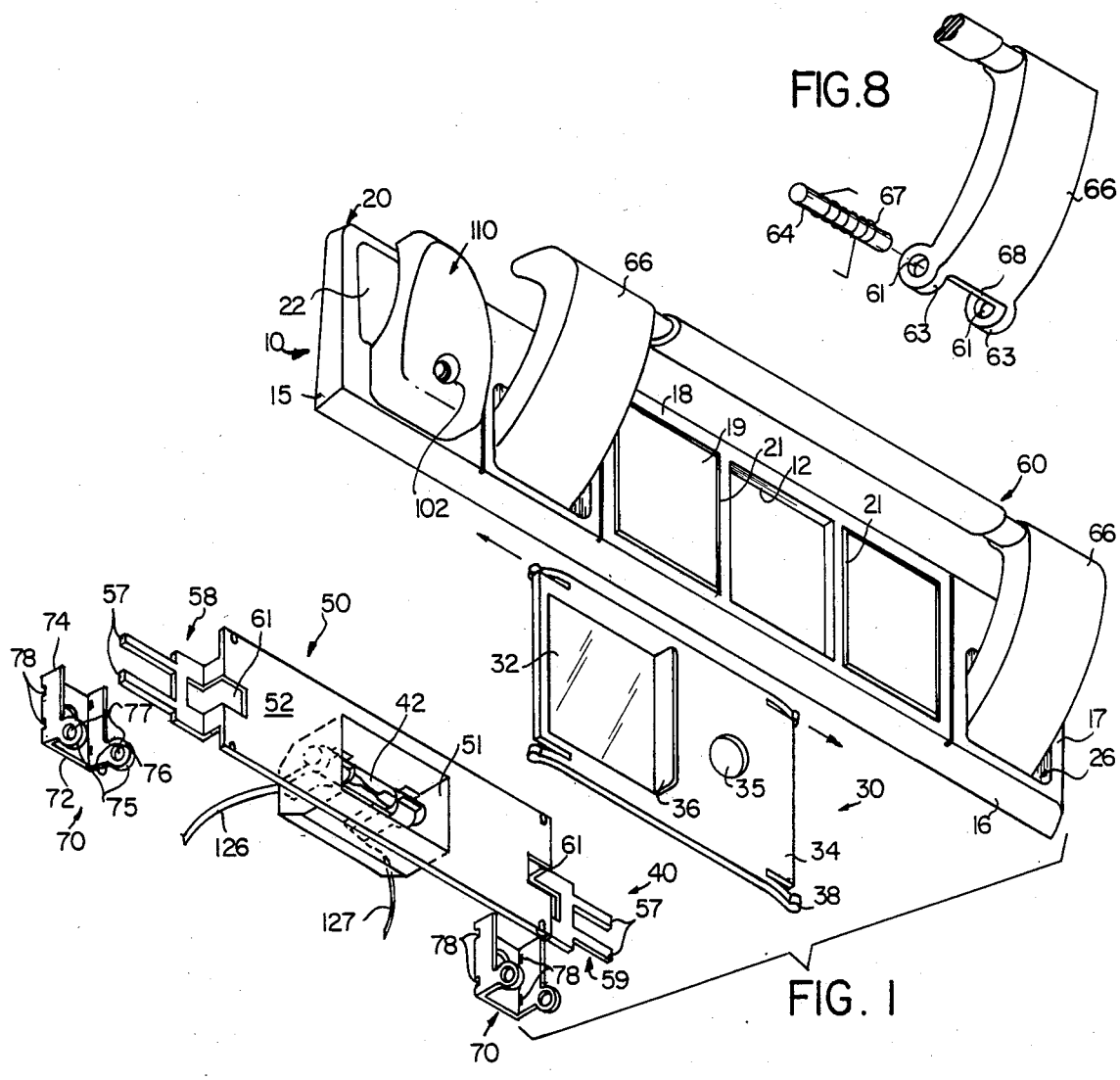

4,686,609

VEHICLE INTERIOR LIGHT

BACKGROUND OF THE INVENTION

The present invention relates to a vehicle interior light assembly and particularly one which is capable of providing different interior lighting effects.

There exists a wide variety of interior vehicle lights such as the commonly employed dome light mounted in the vehicle roof near the center of the vehicle and which is activated either by the opening of a door or independently by the manual actuation of a separate switch. Such lights are useful for providing general interior illumination. Some fixtures employed in vehicles further include one or more additional separately activated lights which include lenses for providing spot lighting in the area of a passenger or driver such that spot illumination can be selectively provided for reading maps, directions or the like during low ambient light conditions. U.S. Pat. No. 4,241,870 discloses a housing with map reading lamps.

U.S. Pat. Nos. 3,917,938 and 3,944,804 disclose interior lighting systems in which sliding panels are provided such that a light source can be employed to provide either focused beams of light or a diffuse light or a combination of the two.

SUMMARY OF THE PRESENT INVENTION

The apparatus of the present invention provides an improved structure for providing selective light from a single lamp to provide either direct spot-type light for map reading or the like or a diffuse light for general interior illumination. Apparatus embodying the invention includes a lamp housing with means for attaching the housing to a vehicle and a lamp mounted within the housing. A cover panel is coupled to the housing, and a light control panel is slidably mounted between the cover panel and housing and includes at least a pair of spaced sections which can be selectively aligned with the lamp for providing at least two unique light control characteristics from the lamp to the interior of the vehicle by movement of the light controlling panel. In one preferred embodiment of the invention, the light control panel controls a pair of switches for the selective actuation of the lamp. In another preferred embodiment of the invention the cover panel additionally includes a pivoted assist handle mounted thereto with the combination mounted to the vehicle roof above a vehicle door. In yet another embodiment of the invention, the cover panel also includes a hook for receiving clothes hangers or the like.

These and other features, objects and advantages of the present invention will become apparent upon reading the following description thereof together with reference to the accompanying drawings in which:

BRIEF DESCRIPTION OF THE DRAWINGS

FIG. 1 is an exploded perspective view of the interior light assembly of the present invention;

FIG. 8 is an enlarged fragmentary perspective view of a portion of the handle mechanism shown also in FIG. 7.

DETAILED DESCRIPTION OF THE PREFERRED EMBODIMENT

Figure 2:
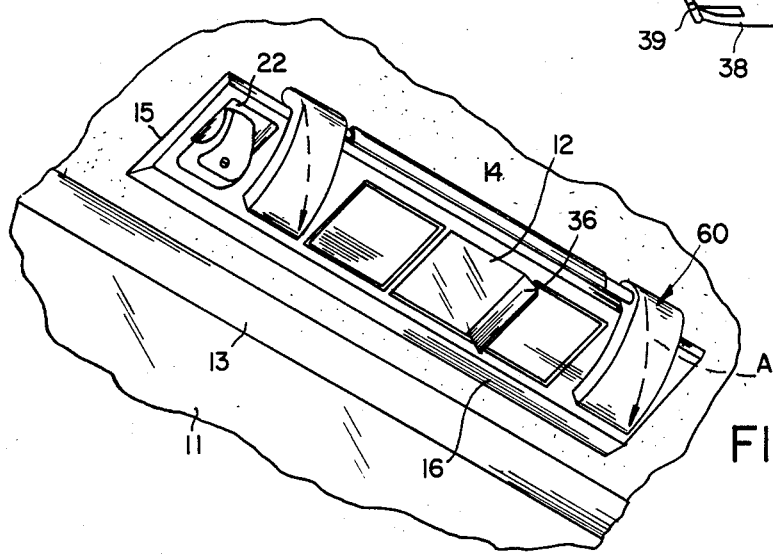
FIG. 2 is a perspective view of the apparatus shown in FIG. 1, shown installed in a vehicle and in a first light controlling position.
Figure 3:
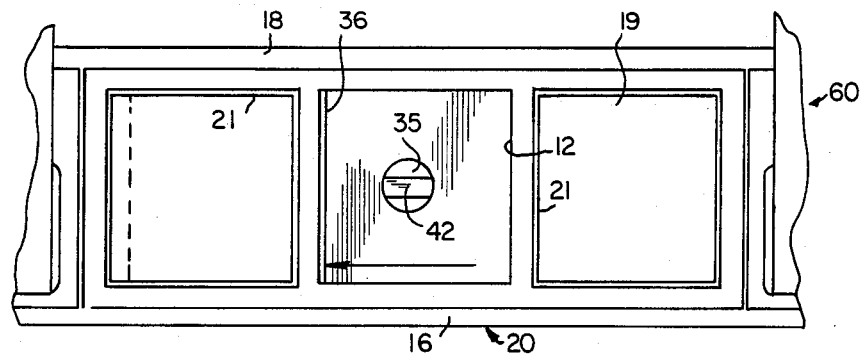
FIG. 3 is an enlarged fragmentary front elevational view of the structure shown in FIG. 2 shown in a second light controlling position.

The vehicle interior light assembly 10 includes a cover panel 20, a light control panel 30 and light means 40 which includes a lamp 42 and a lamp housing 50 (FIGS. 1-3). The light control panel is assembled to be slidably positioned between the lamp 42 and a rectangular aperture 12 formed in panel 20 to selectively control light emitted from lamp 42 when the assembly is mounted to a vehicle as illustrated in FIG. 2. In the embodiment shown, unit 10 is mounted to the right rear passenger side of a vehicle above the right rear window 11 and is mounted to a sheet metal section of the vehicle roof 14 above the door frame 13. The unit 10 also includes a pivoted assist handle 60 which pivots downwardly as illustrated by arrows A from a biased raised stored position, shown in FIG. 2, to a downwardly pivoted use position. In the preferred embodiment also, a clothes hanging hook 110 is provided. The structure and operation of individual components briefly described is now presented.

Panel 20 is a generally elongated rectangular member molded of a suitable polymeric material such as polycarbonate and includes an inwardly projecting peripheral flange integrally including a lower wall 16, side walls 15 and 17, and upper wall 18 surrounding the front wall 19. The light transmissive rectangular aperture 12 is formed through the front wall 19 and is bordered on either side by integrally formed decorative rectangular recesses 21. A concave recess 22 is provided near end 15 to provide clearance for the hook 110 while a pair of apertures 24 and 26 are formed on opposite sides of decorative recesses 21 to permit handle 60 to extend therethrough for mounting as described below. The rear surface of front wall 19 integrally includes U-shaped reinforcing walls 25 and 27 (FIG. 4) which surround the lower edges of apertures 24 and 26 respectively. As can be seen in FIG. 5, the lower wall 16 has a height greater than upper wall 18 to conform the panel 20 to the curvature of the roof line above door frame 13. When installed in a vehicle as shown in FIG. 2, opening 12 faces generally downwardly toward the lap area of a passenger in the seat adjacent window 11.

The light control panel 30 slidably fits behind the front wall 19 of panel 20 in a guide track 31 (FIG. 5) defined by the inner surface 23 of wall 19 of cover 20, the inside of walls 16 and 18 and the outer surface 52 (FIG. 1) of housing 50. Panel 30 includes a pair of rectangular light controlling sections 32 and 34 which are spaced from one another and which can be selectively aligned with aperture 12 to cover the aperture for controlling light from lamp 42 which is projected outwardly through opening 12. Between light controlling sections 32 and 34, there is provided an integrally molded orthogonally extending slide handle 36 for movement of the slide from a first position illustrated in FIG. 2, in which a light diffusing panel 32 is positioned between the light source 42 and the interior of the vehicle, and a second position illustrated in FIG. 3, in which an aperture 35 in the otherwise opaque section 34 is aligned with the bulb 42 to permit a spot of light to be projected directly from the bulb to the general lap area of the passenger nearest the assembly 10. In the preferred embodiment of the invention, panel section 32 of light control panel 30 comprises an insert of translucent material fitted within the molded polymeric panel 30 such as by heat staking or the like within a suitable recessed frame such that light from lamp 42 is diffused to provide general interior illumination therefrom. Panel 30 additionally includes four corner projecting arms 38 which, as best seen in FIG. 6, include rounded tips 39 which ride along the front surface 52 of housing 50 and provide a sliding rattle-free fit of panel 30 in the guide track 31 between cover panel 20 and lamp housing 50. Panel 30 is also integrally molded of a suitable polymeric material such as polycarbonate into which the translucent light diffusing panel 32 is separately mounted in the preferred embodiment.

Figure 4:
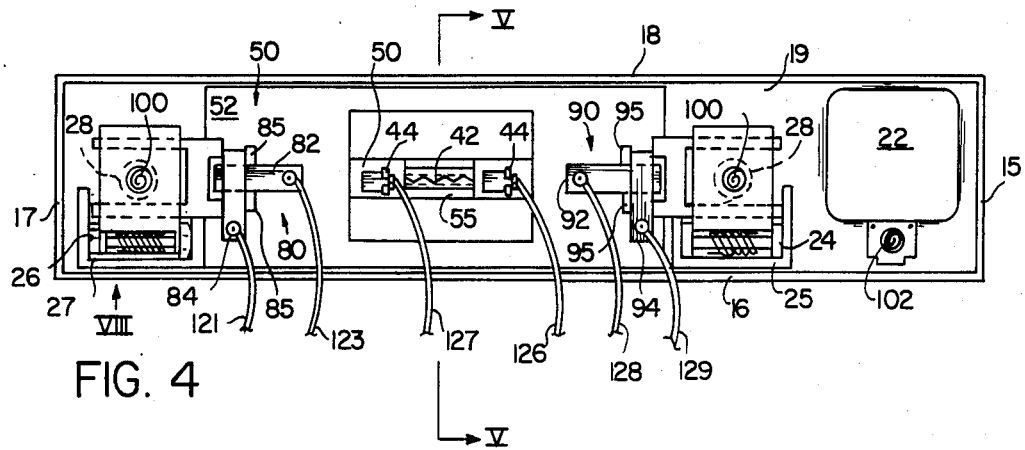
FIG. 4 is a rear elevational view of the structure shown in FIG. 2.
Figure 5:
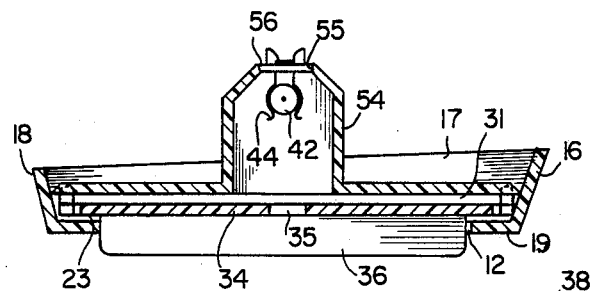
FIG. 5 is an enlarged cross-sectional view taken along section lines V—V of FIG. 4.
Figure 6:
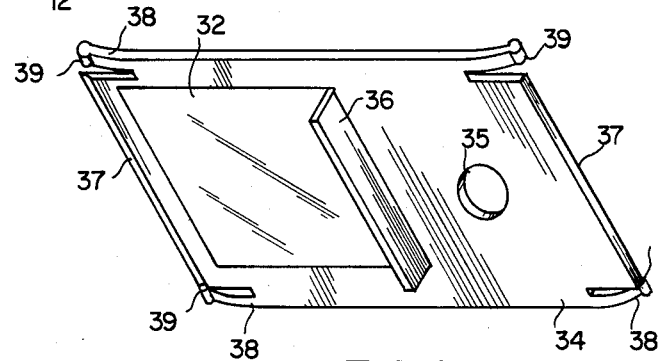
FIG. 6 is an enlarged perspective view of the light controlling panel shown also in FIG. 1.

Behind the light control panel 30 and cover panel 20 is the light housing 50 which is best seen in FIGS. 1, 4 and 5. Housing 50 includes a generally rectangular panel 52 with a rectangular centrally located aperture 51 formed therein for receiving the cartridge-type bulb 42 in the preferred embodiment. Integrally formed with panel 52 is an enclosure 54 into which the bulb 42 is recessed and which includes a venting aperture 55 at the top to allow some of the heat generated by the bulb 42 to escape the lamp housing so defined. Coupled to the rear wall of enclosure 54 are a pair of snap-in electrical contacts 44 for removably receiving bulb 42. Contacts 44 are mounted to the rear wall 56 of enclosure 54 in a conventional manner.

Figure 7:
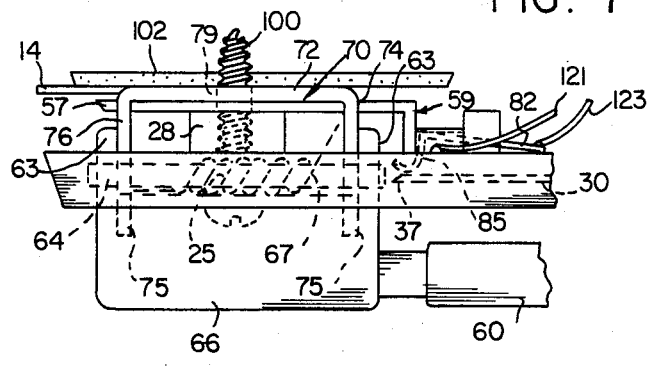
FIG. 7 is an enlarged fragmentary bottom elevational view taken in the direction of arrow VII in FIG. 4.

Extending from opposite ends of panel 52 are rearwardly and outwardly extending dual tabbed L-shaped legs 58 and 59 respectively, each of which includes bifurcated tabs 57 which extend through pairs of spaced slots 78 formed in mounting clips 70 on either side of the housing as described below in conjunction with FIGS. 1, 4 and 7. The tabs 57 of the lamp housing are spaced to extend in generally parallel relationship, and legs 58 and 59 each include a notch 61 which extends also into the edges of panel 52 to provide clearance for the electrical switches 80 and 90 associated with the assembly and actuated by the light control panel 30. The switches 80 and 90 are now described in connection with FIGS. 4, 7 and 9.

At each end of the lamp housing panel 52, there is integrally mounted a single pole, single throw switch 80 and 90 respectively. The switches are each comprised of a pair of contacts 82 and 84, and 92 and 94 respectively, each having one end secured to panel 52 by suitable fastening screws, heat staking, rivets or the like. The contacts are generally elongated rectangular members positioned in orthogonal relationship to one another with contacts 84 and 94 being fixed and overlying movable spring-type contacts 82 and 92 respectively. Each of the contacts 82 and 92 include an inwardly projecting end 85, illustrated in FIG. 7, which has a curved tip. Thus contacts 82 and 92 are selectively engaged by one of the tapered edges 37 of light control panel 30 such that as the panel 30 is moved from one extreme position to the other by handle 36, the movable contacts of one of the switches 80 or 90 will be moved to engage its associated fixed contact to close the switch. This occurs by the deflection of the spring conductive material used to form the switch contacts upwardly through the engagement of tips 85 and 95 by panel 30, as illustrated in FIG. 7, such that the lower underlining contact 82 or 92 moves upwardly to engage the overlying contact 84 or 94 respectively. Integrally molded to panel 52 are outwardly extending pairs of tabs 85 and 95 (FIG. 4) spaced to span opposite sides of contacts 82 and 92 respectively, to prevent rotation of the orthogonal contact pairs during use. The operation of the electrical circuit to provide the desired lighting effects will be described below in connection with FIG. 9 subsequent to the description of the overall assembly of the unit employing the mounting clips 70 which follows.

The assembly 10 also includes a generally U-shaped handle 60 with a pair of legs 66 having mounting bosses 63 (FIG. 8) with apertures 61 at the end of each of the legs 66. The handle is biased against the vehicle roof by a pair of coil springs 67 surrounding pivot axles 64 with one of the free ends of each spring engaging edge 68 of each of the legs 66 and the other end engaging an edge of the clip 70, as illustrated in FIG. 7, to hold the springs in a position to urge handle 60 upwardly against the vehicle roof 14 as illustrated in FIG. 2. The clips 70 are employed for assembling the components and are generally U-shaped in cross section and include side walls 74 and 76, each having a mounting boss 75 on one end. Extending through each of the mounting bosses 75 is an aperture 77 for receiving axle 64 which passes through the clip prior to sliding the axle through handle end 66. The legs 74 and 76 of clip 70 extend within the mounting bosses 63 of handle 60 as best seen in FIG. 7, and tabs 57 of housing 50 are extended through rectangular slots 78 formed in each of the side walls 74 and 76 of clip 70 in spaced relationship with tabs 57 to hold them as illustrated in FIGS. 4 and 7. Each of the clips 70 includes a threaded aperture 79 through which threaded fasteners, such as mounting screws 100, can extend for holding not only the handle and housing assembly together but also securing the entire assembly 10 to a sheet metal section 102 of the vehicle roof as seen in FIGS. 2 and 7. The vehicle will include a preformed roof member with apertures spaced to receive screws 100 associated with each of the mounting clips 70 as well as a mounting screw 102 associated with the hanger hook 110. Screws 100 extend through a pair of apertures 25 (FIG. 7) in panel 20 immediately adjacent recesses 24 and 26 such that when screws 100 are tightened, the heads engage the outer surface of panel 20 and extend through a reinforced mounting boss 28 integrally formed on the rear of panel 20 which also serves as a spacer for clips 70.

The order of assembly of the unit comprises the placement of panel 30 between housing 50 and panel 20 and placing the clips 70 on tabs 57. Next, the handle ends 66 are extended through apertures 24 and 26 until their apertures 61 align with apertures 77 of the clips. The pivot rods 64 are then passed through the handles and clips while positioning the springs 67 between the mounting bosses 63. The screws 100 are then loosely inserted to complete the preassembly prior to installation on a vehicle.

Vehicle installation is achieved by first coupling the electrical conductors as described below and then tightening screws 100 through apertures 79 in clips 70 and into roof member 102, the screw heads compressibly secure panel 20, housing 50, legs 57, clips 70 and roof 102 together for securing the assembly to the vehicle. The assembly 10 can be preassembled loosely with screw 100 holding the parts in relationship until such time as the screws 100 are tightened into the vehicle itself. The hanger 110 is then installed by the insertion and tightening of screw 102.

Figure 9:
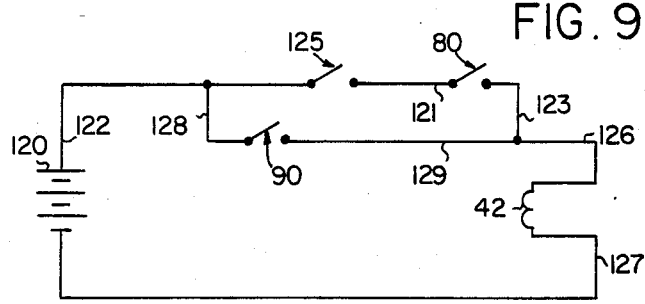
FIG. 9 is an electrical circuit diagram in schematic form of the electrical circuit employed in the apparatus of the present invention.

FIG. 9 shows the vehicle's electrical power system including the vehicle battery 120 to which there is coupled one or more door activited switches 125 for the vehicle's courtesy lights. The connection of battery 120 is typically through the vehicle's wiring harness represented generally by conductors 122 in FIG. 9. Switch 80, associated with the diffuse light position of panel 30, as illustrated in FIG. 2, is coupled in series with the door activated courtesy lamp switch 125 by conductors 121 and 123 with the combination coupled between power source 120 and lamp 42 by conductors 126 and 127. Coupled in parallel with the series combination of switches 125 and switch 80 by conductors 128 and 129 is the spot switch 90 which couples bulb 42 directly to the vehicle power source 120 such that when handle 36 is moved to the spotlighting position as illustrated in FIG. 3, lamp 42 will be activated regardless of the position of the courtesy light switch 125. If the sliding panel 30 is in an intermediate position, both switches 80 and 90 will be open as shown in FIG. 9, and lamp 42 cannot be activated. Switch 125 is represented as a single switch, with it being understood that several parallel switches are employed in the vehicle system, one typically for each of the vehicle doors and a manually operated separate switch usually located on the vehicle dashboard for manually operating the vehicle's courtesy lamps. When any one of those switches are actuated, power will be applied to switch 80 such that if switch 80 is in a closed position, lamp 42 will be illuminated. Typically, multiple contact connectors will be employed to couple the various conductors of unit 10 to the associated conductors built into the vehicle.

A vehicle may include several of the interior light assemblies 10 which in some embodiments may not include the assist handle and/or the clothes hook. These and other modifications of the present invention can be made by those skilled in the art without departing from the spirit or scope of the invention as defined by the appended claims.

We claim:

1. An interior light for a vehicle comprising:
   a lamp housing for attachment to a vehicle;
   lamp means positioned within said housing;
   a cover panel coupled to said housing, said housing and panel cooperatively defining a guide track therebetween which extends in alignment with said lamp means;
   a light control panel slidably mounted within said guide track, said light control panel including at least a pair of spaced sections which can be selectively aligned with said lamp means with each of said sections including means for uniquely controlling light from said lamp to provide a selectable lighting effect by movement of said light control panel; and
   a generally U-shaped assist handle and means for pivotally mounting said handle to said cover panel.

2. The apparatus as defined in claim 1 wherein one of said sections of said light control panel includes means for diffusing light from said lamp.

3. The apparatus as defined in claim 2 wherein the other of said sections of said light control panel comprises an opaque material having an aperture formed therein to allow light from said lamp to pass therethrough.

4. The apparatus as defined in claim 3 wherein said aperture is circular and has a diameter about equal to the width of said lamp means.

5. The apparatus as defined in claim 1 and further including switch means positioned to be engaged by said light control panel to activate said lamp means when said panel is in a predetermined position.

6. The apparatus as defined in claim 5 wherein said switch means comprises a pair of switches mounted to said housing near opposite ends of said guide track to activate said lamp means when said light control panel is at either end of its travel.

7. An interior light for a vehicle comprising:
   a lamp housing for attachment to a vehicle;
   lamp means positioned within said housing;
   a cover panel coupled to said housing, said housing and panel cooperatively defining a guide track therebetween which extends in alignment with said lamp means;
   a light control panel slidably mounted wtihin said guide track, said light control panel including at least a pair of spaced sections which can be selectively aligned with said lamp means with each of said sections including means for uniquely controlling light from said lamp to provide a selectable lighting effect by movement of said light control panel, wherein one of said sections of said light control panel includes means for difffusing light from said lamp, and wherein the other of said sections of said light control panel comprises an opaque material having a circular aperture formed therein having to allow light from said lamp to pass therethrough; and
   a generally U-shaped assist handle and means for pivotally mounting said handle to said cover panel.

8. The apparatus as defined in claim 7 wherein said housing and cover panel are adapted to be mounted to the roof of a vehicle and wherein said means for pivotally mounting said handle includes bias means coupled between said handle and said cover panel to urge said handle to a position adjacent the cover panel and vehicle roof.

9. An interior light for a vehicle comprising:
   lamp means:
   means for mounting said lamp means in a fixed position in a vehicle;
   a light control panel slidably secured to said means for mounting said lamp means, said light control panel including at least a pair of spaced sections and handle means positioned between said sections for sliding said panel between opposed end-of-travel positions in which one of said sections is aligned with said lamp means, and wherein each of said sections includes means for uniquely controlling light from said lamp to provide a selectable lighting effect by sliding said light control panel to position one of said sections in alignment with said lamp means; and
   switch means positioned on said mounting means to be engaged by said light control panel to activate said lamp means when said panel is in an end-of-travel position, wherein said switch means comprises a pair of switches mounted near opposite ends of the travel path of said light control panel to activate said lamp means only when said light control panel is at either end of its travel.

10. The apparatus as defined in claim 9 wherein one of said sections of said light control panel includes means for diffusing light from said lamp.

11. The apparatus as defined in claim 10 wherein the other of said sections of said light control panel comprises an opaque material having an aperture formed therein to allow light from said lamp to pass therethrough.

12. The apparatus as defined in claim 11 wherein said aperture is circular and has a diameter about equal to the width of said lamp means.

13. An interior light for a vehicle comprising:
   lamp means;
   means for mounting said lamp means in a fixed position in a vehicle;
   a light control panel slidably secured to said means for mounting said lamp means, said light control panel including at least a pair of spaced sections which can be selectively aligned with said lamp means with each of said sections including means for uniquely controlling light from said lamp to provide a selectable lighting effect by sliding said light control panel to position one of said sections in alignement with said lamp means, wherein said light control panel includes a handle extending between said sections for movement of said panel;
   switch means positioned on said mounting means to be engaged by said light control panel to activate said lamp means when said panel is in a predetermined position, wherein said switch means comprises a pair of switches mounted near opposite ends of the travel path of said light control panel to activate said lamp means when said light control panel is at either end of its travel, and wherein one of said sections of said light control panel includes means for diffusing light from said lamp and the other of said sections of said light control panel comprises an opaque material having a circular aperture formed therein with a diameter about equal to the width of said lamp means to allow light from said lamp to pass therethrough; and
   a generally U-shaped assist handle and means for pivotally mounting said handle to said means for mounting said lamp means.

14. The apparatus as defined in claim 13 wherein said lamp means is mounted to the roof of a vehicle and wherein said means for pivotally mounting said handle includes bias means coupled between said handle and said mounting means to urge said handle to a position adjacent the vehicle roof.

15. The apparatus as defined in claim 14 and further including a clothing hanger hook secured to said mounting means in spaced relationship to said handle.

16. An interior light assembly for directing spot or diffuse light to the interior of a vehicle comprising:
   a lamp housing for attachment to a vehicle;
   lamp means positioned within said housing;
   a cover panel for attachment to said housing;
   a light control panel slidably mounted between said housing and said cover panel, said light control panel including at least a pair of spaced sections which can be selectively aligned with said lamp means wherein one of said sections of said light control panel includes means for diffusing light from said lamp and the other of said sections of said light control panel comprises an opaque material having an aperture formed therein to allow light from said lamp to pass therethrough; and
   means for securing said cover panel to said housing and to a vehicle such that light from said lamp means is directed downwardly.

17. The apparatus as defined in claim 16 wherein said aperture is circular and has a diameter about equal to the width of said lamp means.

18. The apparatus as defined in claim 16 and further including switch means positioned to be engaged by said light control panel to activate said lamp means when said panel is in a predetermined position.

19. The apparatus as defined in claim 18 wherein said switch means comprises a pair of switches mounted to said housing near opposite ends of said guide track to activate said lamp means when said light control panel is at either end of its travel.

20. The apparatus as defined in claim 19 and further including a generally U-shaped assist handle and means for pivotally mounting handle to said cover panel.

* * * * *